June 1, 1937.  T. T. LOGIE  2,081,941
BRACKET FOR AUTOMOBILE ROBE SUPPORTS
Filed June 6, 1936
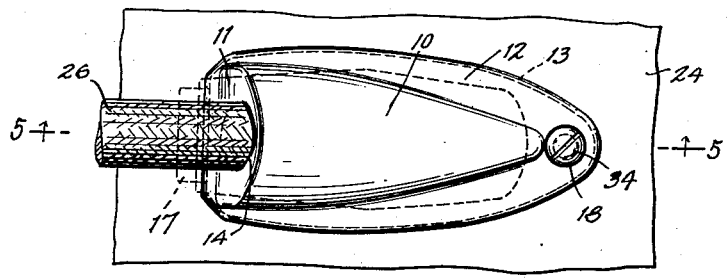
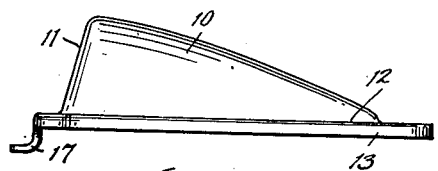
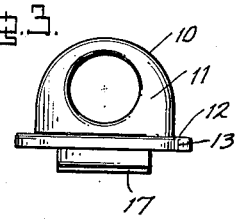
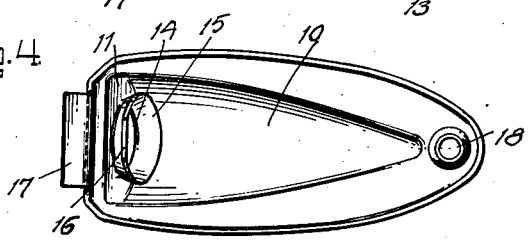
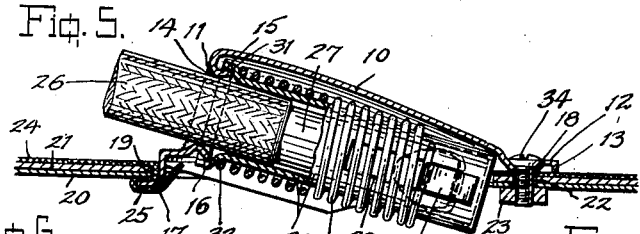
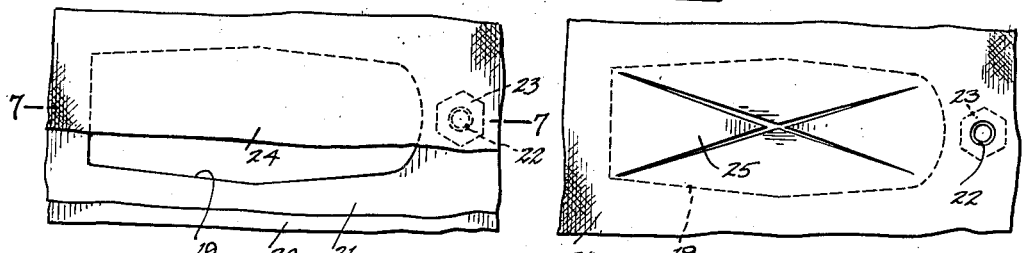
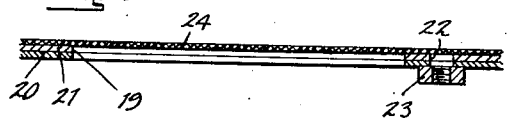
INVENTOR
THOMAS T. LOGIE.
BY
ATTORNEY Patented June 1, 1937

2,081,941

UNITED STATES PATENT OFFICE 2,081,941

BRACKET FOR AUTOMOBILE ROBE SUPPORTS

Thomas T. Logie, Bridgeport, Conn., assignor to The Bassick Company, Bridgeport, Conn., a corporation of Connecticut Application June 6, 1936, Serial No. 83,854

5 Claims. (Cl. 105—354)

The present invention relates to a bracket for automobile robe support and has for an object to provide a bracket of simple and inexpensive construction, and which may be secured to the back of the automobile seat, where such robe supports are usually located, with greater facility than has been possible heretofore. In particular it is proposed to provide means whereby the bracket may be hooked into interlocking relation with one end of an opening provided in the seat back, this end being the end covered by the robe supporting cord and not easily accessible for the attachment of a screw, and the other end being secured simply by a single screw, rivet or the like. Another object is to provide a bracket by means of which the fabric upholstery covering will be more firmly held in relation to the opening provided in the seat back without any tendency to wrinkle or work loose, the method of attaching the bracket being such that the upholstery is drawn tightly into relation with the opening as the bracket is fitted in place, and being then securely held by the bracket when the latter is fastened.

With the above and other objects in view, an embodiment of the invention is shown in the accompanying drawing, and this embodiment will be hereinafter more fully described with reference thereto, and the invention will be finally pointed out in the claims.

In the drawing:

Fig. 1 is a plan view of a bracket according to the illustrated exemplary embodiment of the invention, and showing the same attached to the seat back, and with the end of the robe support engaged therein.

Fig. 2 is a side elevation of the bracket.

Fig. 3 is an inner end view thereof.

Fig. 4 is a bottom plan view.

Fig. 5 is a longitudinal sectional view taken along the line 5—5 of Fig. 1.

Fig. 6 is a plan view of a portion of the seat back showing the opening provided in the sheet metal and cardboard structure of the back and showing the fabric upholstery covering partially broken away.

Fig. 7 is a longitudinal sectional view taken along the line 7—7 of Fig. 6.

Fig. 8 is a plan view showing the fabric covering slitted in relation to the opening in the seat back preparatory to mounting the bracket.

Similar reference characters indicate corresponding parts throughout the several figures of the drawing.

Referring to the drawing, the bracket according to the illustrated exemplary embodiment of the invention is preferably formed of sheet metal drawn to shape in suitable dies, and comprises a pocket portion 10 having an inclined inner face 11 from which the pocket portion tapers toward the base 12, which latter is provided with a peripheral right angularly bent flange 13. The inclined face 11 is provided with a circular opening 14 having an inwardly curved diverging flange 15 adapted to form a bearing for the cord portion 26 of the robe support. This flange is provided at its base portion with a downwardly bent lip 16 with which a recess of the tubular member at the end of the cord is interlockingly engaged, as will hereinafter more fully appear. The inner transverse end of the flange 13 is straight and is provided with a locking right angle bent hook-shaped lip 17 extending downwardly and projecting forwardly therefrom. The base 12 is provided at its outer end with a countersunk screw hole 18.

The seat back is provided for attachment of the bracket according to the invention by providing an elongated opening 19 in the metal structure 20 and the cardboard covering 21 of the back, the inner edge of the opening 19 being straight and the other edges adapted to be withstraight in the peripheral flange 13 of the bracket. A screw hole 22 is also provided in the metal structure 20 and cardboard covering 21 in spaced relation to the outer end of the opening 19, and to the inner side of the metal structure 20 there is secured, preferably by welding, a nut 20 in alignment with the hole 22. The fabric upholstery covering 24 extends over the opening 19 as clearly shown in Fig. 6. In order to attach the bracket the fabric covering is slit, as shown in Fig. 8, so that the opening 19 is exposed and a flap 25 of the covering is free to be folded about the straight inner edge of the opening 19.

The cord 26 is resiliently connected at its end in a substantially similar manner to the structure disclosed in the U. S. patent to Arthur Claud-Mantle, for Automobile robe support and bracket therefor, No. 2,031,496, granted February 18, 1936, being provided at its end with an eye clip member 27 engaged by a cross-piece 28, having its ends projected outwardly through slots 29—29 in a tubular shell 30, having its forward shouldered and flanged end 31 seated on the edge of the flange 15, and being provided with a recess 32 engaged by the lip 16 to prevent relative turning of the shell. A helical spring 33 is disposed about the shell between the shoulder 31 and the cross-piece 28 and normally draws the end of the cord inwardly. Outward pull on the cord is limited by abutment of the cross-piece 28 with the forward ends of the slots 29—29.

In assembling the bracket is first threaded on the cord and the shell 30, cross-piece 28 and spring 33 are then assembled. The bracket is thereupon secured to the seat back by hooking the locking lip 17 about the inner edge of the opening 19 over the flap 25 of the fabric covering 24 and then swinging the outer end into place, this action drawing the covering tightly about the edge of the opening where it is securely held, the locking lip at the same time securing the inner end of the bracket through its locking engagement with the inner side of the seat back and the engagement of the edge of the flange 13 with the outer surface of the seat back. The bracket is thereupon fixedly secured in place by means of the single screw 34 engaged in the countersunk screw hole 18 and screwed into the nut 23.

It will be understood that a bracket is provided in a similar manner at the other end of the cord. Also it will be understood that the cord end may be fixedly anchored in the bracket, instead of the resilient connection, if desired.

I have illustrated and described a preferred and satisfactory embodiment of the invention, but it will be obvious that changes may be made therein, within the spirit and scope thereof, as defined in the appended claims.

Having thus described my invention what I claim and desire to secure by Letters Patent is:—

1. In a bracket for a robe cord or the like for attachment to a seat back or the like having an opening therein, a hollow casing for receiving the cord end, a hook member at one end of said casing adapted to be interlockingly engaged with an edge of said opening, and means at the other end of said casing for securing said other end to the seat back.

2. In a bracket for a robe cord or the like for attachment to a seat back or the like having an opening therein, a hollow casing having a robe cord opening at one end for receiving the cord end, a base for said casing, a hook member at the same end of said casing as said robe cord opening adapted to be interlockingly engaged with an edge at one end of said opening, said hook member engaging the inner side of said seat back and said base engaging the outer side of said seat back at each side of said opening, and means at the other end of said casing for securing said other end to said seat back.

3. In a bracket for a robe cord or the like for attachment to a seat back or the like having an opening therein, a hollow casing having a robe cord opening at one end for receiving the cord end, a base for said casing, a hook member at the same end of said casing as said robe cord opening of right-angular cross-section extending inwardly and forwardly from said base adapted to be interlockingly engaged with an edge at one end of said opening, said hook member engaging the inner side of said seat back and said base engaging the outer side of said seat back at each side of said opening, and means at the other end of said casing for securing said other end to said seat back.

4. In combination, a seat back or the like having an opening therein, a flexible covering extended over said opening and slit to dispose a portion of said covering about an edge of said opening, a hollow casing, a hook member at one end of said casing adapted to be interlockingly engaged with said edge of said opening, to secure said covering about said edge, and means at the other end of said casing for securing said other end to the seat back.

5. In combination, a seat back or the like having an opening therein, a flexible covering extended over said opening and slit to dispose a portion of said covering about an edge of said opening, a hollow casing having a robe cord opening at one end for receiving the cord end, a base for said casing, a hook member at the same end of said casing as said robe cord opening adapted to be interlockingly engaged with an edge at one end of said opening to secure said covering about said edge, said hook member engaging the inner side of said seat back and said base engaging the outer side of said seat back at each side of said opening and means at the other end of said casing for securing said other end to said seat back.

THOMAS T. LOGIE.